United States Patent
Nilsson et al.

(10) Patent No.: US 7,853,979 B2
(45) Date of Patent: Dec. 14, 2010

(54) METHOD AND SYSTEM FOR UNEVEN DISTRIBUTION OF DATA

(75) Inventors: Daniel Nilsson, Valbo (SE); Jonas Lindberg, Haninge (SE)

(73) Assignee: Telia AB (Publ), Farsta (SE)

( * ) Notice: Subject to any disclaimer, the term of this patent is extended or adjusted under 35 U.S.C. 154(b) by 436 days.

(21) Appl. No.: 10/564,065

(22) PCT Filed: Jul. 6, 2004

(86) PCT No.: PCT/SE2004/001106
§ 371 (c)(1),
(2), (4) Date: Jun. 22, 2006

(87) PCT Pub. No.: WO2005/006760
PCT Pub. Date: Jan. 20, 2005

(65) Prior Publication Data
US 2006/0280173 A1 Dec. 14, 2006

(30) Foreign Application Priority Data
Jul. 10, 2003 (SE) .................................. 0302041

(51) Int. Cl.
*H04N 7/173* (2006.01)
(52) U.S. Cl. ...................... 725/86; 725/89; 725/90; 725/98
(58) Field of Classification Search .................. None
See application file for complete search history.

(56) References Cited

U.S. PATENT DOCUMENTS

| | | | |
|---|---|---|---|
| 6,141,486 A | 10/2000 | Lane et al. | |
| 6,728,243 B1* | 4/2004 | Jason et al. | 370/392 |
| 6,889,327 B1* | 5/2005 | Inoha | 713/193 |
| 2002/0073205 A1* | 6/2002 | Mostafa | 709/227 |
| 2002/0095683 A1* | 7/2002 | Watanabe | 725/90 |
| 2003/0065802 A1* | 4/2003 | Vitikainen et al. | 709/231 |
| 2004/0003399 A1* | 1/2004 | Cooper | 725/38 |
| 2004/0268400 A1* | 12/2004 | Barde et al. | 725/94 |
| 2005/0021806 A1* | 1/2005 | Richardson et al. | 709/231 |

FOREIGN PATENT DOCUMENTS

| | | |
|---|---|---|
| EP | 1 261 180 | 11/2002 |
| WO | 02/11398 | 2/2002 |
| WO | 02/052860 | 7/2002 |
| WO | 02/063849 | 8/2002 |

* cited by examiner

*Primary Examiner* — John W Miller
*Assistant Examiner* — Chenea P Smith
(74) *Attorney, Agent, or Firm* — Oblon, Spivak, McClelland, Maier & Neustadt, L.L.P.

(57) ABSTRACT

A method to transmit streamed information at a wireless tele- and data communication network by transmitting streamed high prioritized information via a secure medium, whereas low prioritized data are transmitted over a standard channel. The method combines two technologies, MMS and Streaming, to guarantee that a video client in a mobile terminal has access to high prioritized data on the right occasion. By using MMS as an initial notification for the medium, in a message just any amount of high prioritized information can be enclosed, for instance any number of I-frames. The video client in this way has a lead at the video decoding, and the streaming protocol will have more time to secure that the rest of data actually will get through.

8 Claims, 5 Drawing Sheets

METHOD AND SYSTEM FOR UNEVEN DISTRIBUTION OF DATA

TECHNICAL FIELD

The present invention relates to a method to transmit streamed prioritized information via a secure medium, for instance MMS, in a wireless tele- and data communication network, whereas the subsequent differential data are transmitted over a standard channel.

PRIOR ART

Most types of media often can be divided into high and low prioritized data. High prioritized data can be compared to a frame which has to exist to keep up details (low prioritized data). For instance a video sequence consists of two types of frames; I-frame (Intra-frame) and P-frame (Predicted frame). An I-frame includes all information to show a complete picture, whereas a P-frame only includes changes from previous picture. With this technology it will not be necessary to transmit I-frames continually to achieve moving pictures, but it will be sufficient that perhaps each 10:th frame is of I-type, the frames in between can be of P-type. A pattern similar to IPPP . . . IPPP should be possible to achieve.

But if now an I-frame disappears, or is destroyed, this error will go on in subsequent P-frames, the error will propagate until next I-frame is decoded because P-frames are depending on that I-frames are correct, see FIG. 1.

I-frames are high prioritized data (or the frame), whereas P-frames are low prioritized data. It consequently is very important that the high prioritized information is distributed faultless to the client since an error in this is reflected in the low prioritized information.

The protocol which today is used at streaming (RTSP/RTP) is UDP/IP (Universal Datagram Packet/Internet Protocol) as carrier. UDP, however, neither can guarantee that a packet arrives to the receiver, nor can it prioritize different types of data, but all packets are handled in the same way, irrespective of content. The above mentioned problem the user tries to tackle by means of buffering data before streaming which gives the system some seconds to request re-transmission of important data if it should disappear during the transmission. The only method one has in this solution to improve the guarantee that the information will arrive correctly consequently is to extend the buffers which results in longer periods of waiting for the user.

US 2002/054638 shows a procedure to separate transcoded data from differential ones in an MPEG-signal. These then are transmitted over different channels. The stated reason is to keep down the size of the buffer in the receiver. Differential data can be transmitted after the transcoded ones.

U.S. Pat. No. 6,041,068 shows a procedure to distinguish I-frames from an MPEG-signal and transmit these as an appetizer to tempt to purchase of the whole signal.

US 2002/073205 shows a procedure according to which MMS is used to inform a user that a streaming media content is waiting to be loaded via another channel.

SUMMARY OF THE INVENTION

The present invention relates to a method to, at a wireless tele- and data communication network, make it possible to transmit streamed prioritized information via a secure medium, for instance MMS, whereas differential data are transmitted over a standard channel. This consequently means that data are divided into high and low prioritized data.

The present invention is a combination of MMS and Streaming. By using MMS as an initial notification for the medium, it will be possible to transmit messages with any amount of high prioritized information. For instance any number of I-frames. The video client by that has a lead at video decoding and the streaming protocol will have more time to guarantee that the rest of the information will get through.

The difference of the method compared with existing systems is the utilization of MMS (or an initially secure distribution of information) to create a streaming solution which increases the security that high prioritized information shall be accessible on right occasion without need for higher available bandwidth. This is done by means of the displaced distribution of the high prioritized data.

BRIEF DESCRIPTION OF THE DRAWINGS

The invention will be described in more details in the following with references to enclosed drawings, in which.

DESCRIPTION OF PREFERRED EMBODIMENTS

The invention is a combination of two technologies, MMS and Streaming, to guarantee that the video client in the mobile terminal has access to high prioritized data on right occasion. By using MMS as an initial notification for the medium, it will be possible to transmit such a message with just any amount of high prioritized information, for instance any number of I-frames. The video client in this way has a lead at the video decoding, and the streaming protocol will have more time to guarantee that the rest of data actually will get through.

In the following text, the example above with different frames will be used to simplify the explanation.

Figure 1:
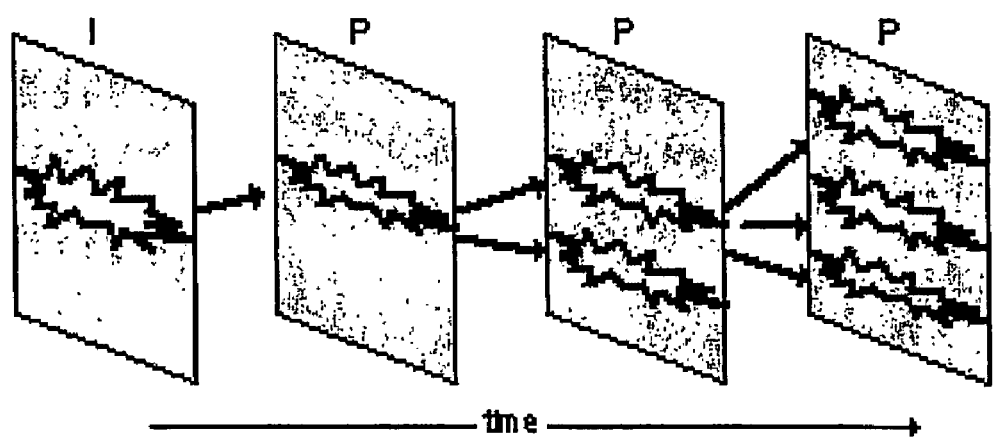
FIG. 1 shows propagation of errors at faulty I-frame.
Figure 2:
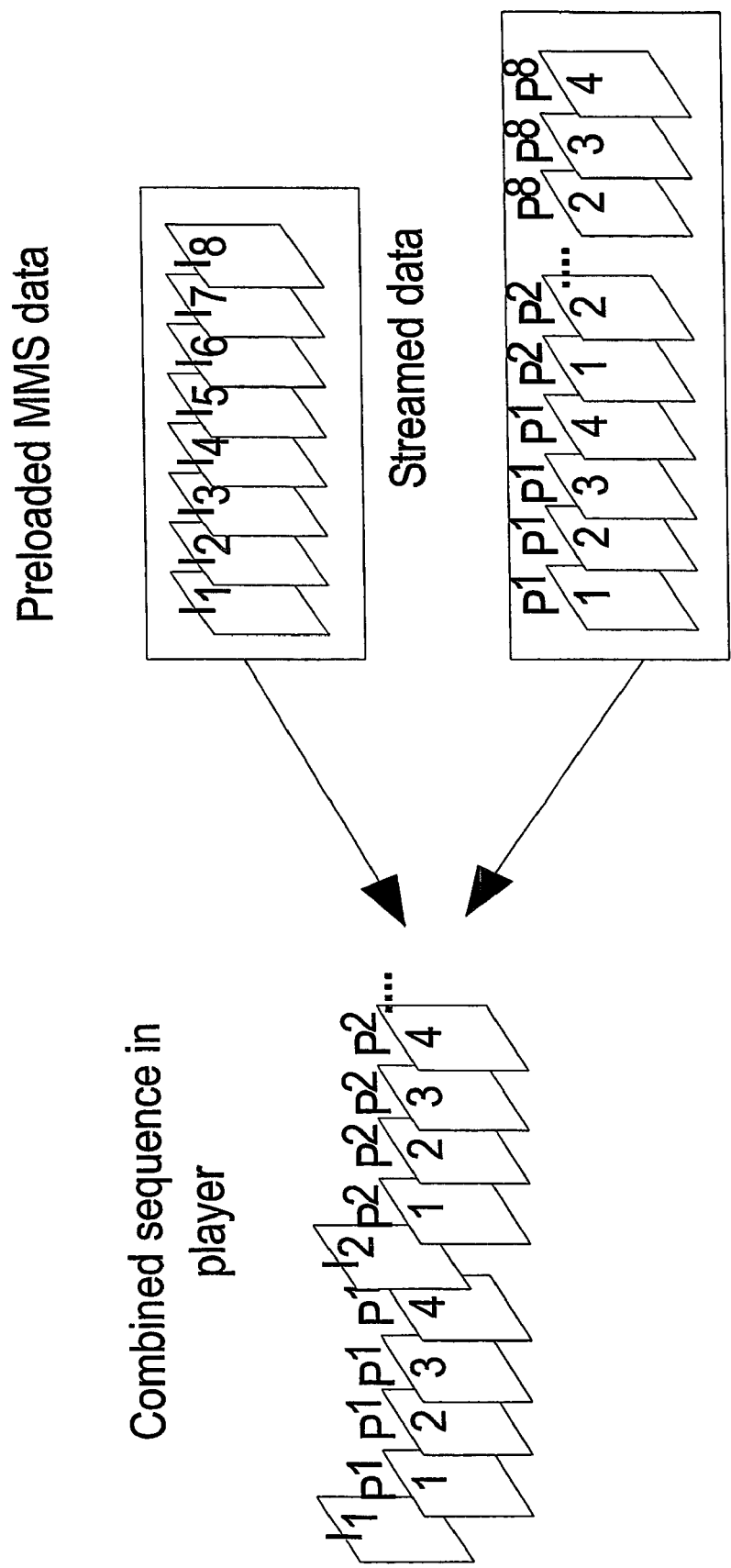
FIG. 2 shows short video sequence where all I-frames are transmitted via MMS, and other data (P-frames) are streamed.

The invention can be utilized in different ways: One alternative is when the video sequence is short; then all high prioritized information (I-frames in the example) is transmitted in the MMS message. The streaming part only need to concentrate on streaming the low prioritized information (P-frames in the example), see FIG. 2.

Figure 3:
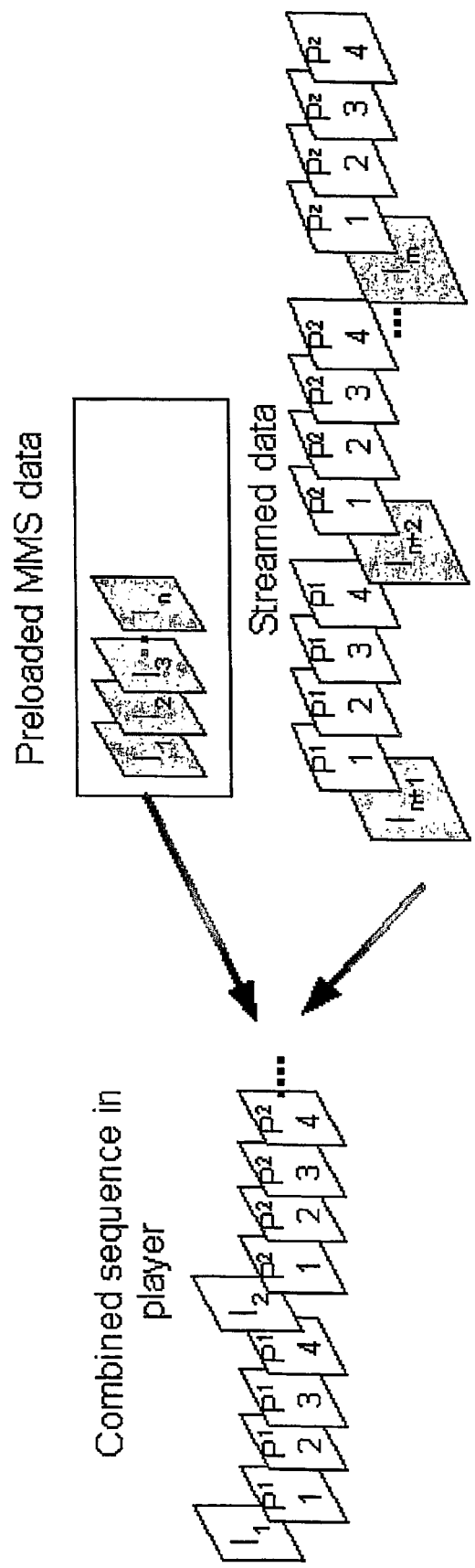
FIG. 3 shows long video sequence where all I-frames are transmitted via MMS asymmetrically, and other data (P-frames) are streamed.

A second alternative is when the video sequence is long; then an asymmetrical transport/transmission of information is created. This is done by the high prioritized information being displaced in time. If problems occur with the transmission of I-frames, or if high prioritized data become faulty, the application/system will have more time to correct this, see FIG. 3. To the left in FIG. 3, normal flow of the information in a system. To the right in FIG. 3, notice the displaced high prioritized information, I-frame, displaced in the streamed data.

Another example is if the system now, for instance, decodes frame $p^2_4$, and frame $I_{n+2}$ should be faulty transmitted, then the system will have ~n times longer time to try to transmit $I_{n+2}$ compared with ordinary streaming.

The method can in principle be used in all video applications where the system uses any kind of notification (for instance e-mail).

But of particular interest is in mobile connections (GPRS/UMTS) where there is a very limited bandwidth and where one wants to do the streaming over a Best-Effort channel. In connection with that UMTS will enter into the market, there also will be more new types of services realized, such as video. It may be expensive to run all video over UMTS by means of QoS, which moreover is not available in GPRS. There will be more services which have to be executed/run over the cheaper Best-Effort-channels.

In the first alternative above, where the sequence is rather short, this method might be possible to use at a short video trailer to some persons. These then can at first see a "still-slideshow" of the sequence. In case the user then instead wants to see the whole sequence, the system only needs to stream over the lacking P-frames; in that way the quality of the sequence is increased at the same time as the bandwidth is reduced.

The solution also would be possible to use in other systems where separation of high and low prioritized information is done. For example at building of a security solution where some part of the information is transmitted via MMS (for which the system can charge, and identify the user) which is necessary to make it possible to use the rest of the information.

Figure 4:
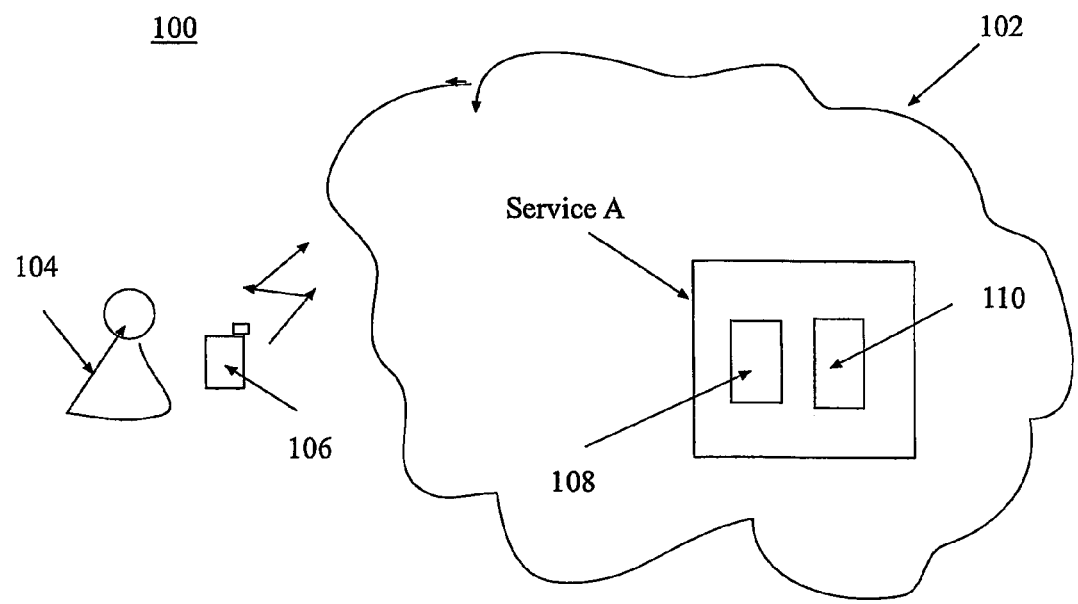
FIG. 4 shows comprehensive representation/picture of the system for storing of streaming data.

One way of transmitting high prioritized data is shown in FIG. 4. FIG. 4 shows a system 100 for storing of streaming data which consists of a wireless tele- and data communication network 102 and a user 104 with a terminal 106. In the network is that part where a wanted service A is, which consists of a streaming server 108 and an MMS-server 110.

Figure 5:
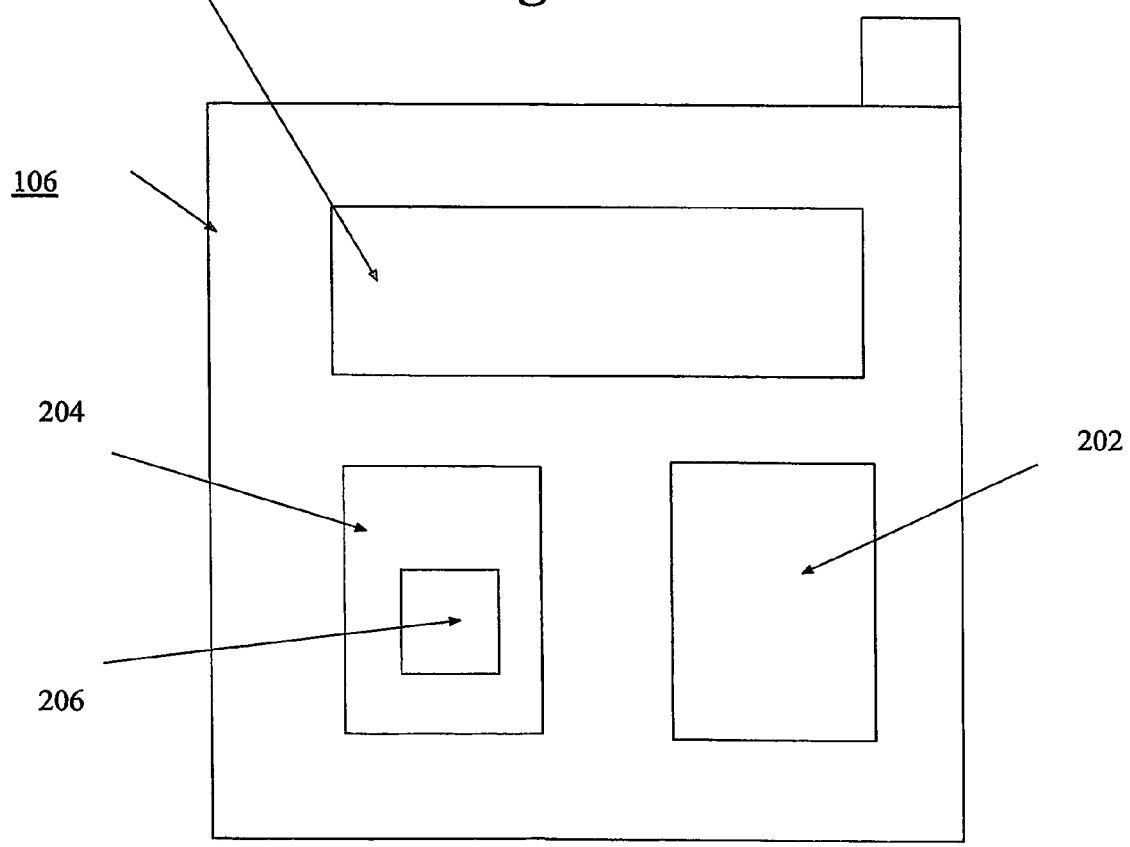
FIG. 5 shows a terminal.

In FIG. 5 the terminal 106, which uses the service A, is shown. The terminal includes i.a. an MMS-client 202, a streaming client 204, a streaming buffer 206 and a presentation/display unit 208.

Figure 6:
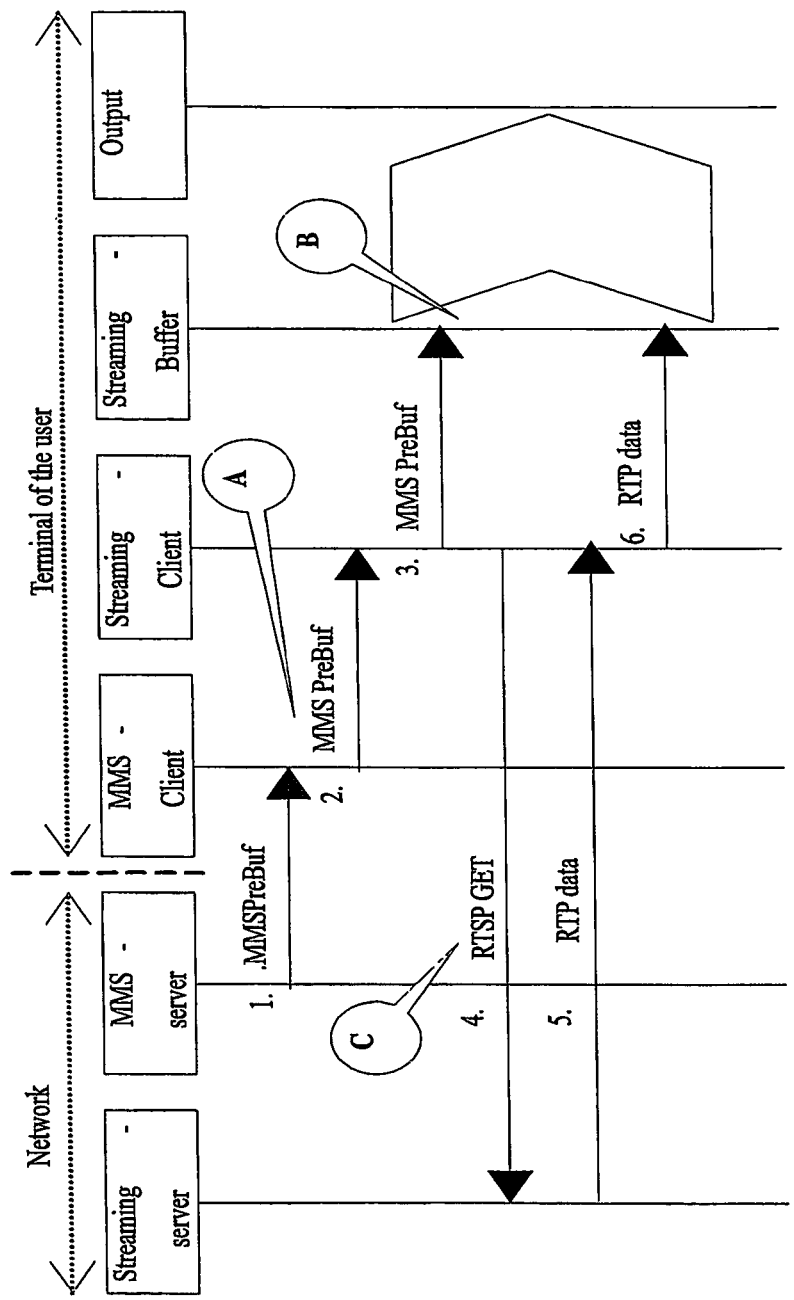
FIG. 6 shows a procedure for storing of streamed services.

In FIG. 6 a procedure 300 for storing of services is shown.

According to the present invention, the procedure includes the following steps: Step 1, 302, of the procedure amounts to that a user 104 receives an MMS notification with an arbitrary greeting message and an appendix in which the initial streaming buffer "MMS PreBuf" and a streaming pointer are. The streaming pointer is an ordinary rtsp-link and an example of this is: "rtsp://server.com./file.mp4".

In step 2, 304, the user 106 decides to start the streaming session; the service is in this way activated in the MMS client 202 by user 104 requesting open the appendix of the MMS, at which the streaming client 204 is automatically started. The MMS client 202 then transmits/transfers "MMS PreBuf" (buffer data and streaming link) to the streaming client 204.

In step 3, 306, the streaming client 204 places/puts the enclosed information "MMS PreBuf" in its streaming buffer 206.

In step 4, 308, the user 106 then initiates a session with the streaming server 108 "RTSP GET" which starts streaming back the rest of the information.

In step 5, 310, the information "RTP data" will reach the streaming client 204 from the streaming server 108.

In step 6, 312, "RTP data" is placed/put in the streaming buffer 206.

At point A: The data which are enclosed in the MMS can be of just any kind. In the case with media (video/audio) it can, for instance, be the first seconds of the sequence.

The streaming buffer 206 should in this case correspond to about 15 s streaming. In case that a bit rate of 64 kbit/s is used, it will correspond to an amount of data of 120 kB.

At point B: When the streaming user transmits the initial buffer data to the streaming buffer, this will "believe" that it is only ordinary data, and has no knowledge of that these have been streamed or been loaded from the memory. In the same way the streamed information just can be added to the streaming buffer without any problems occurring.

At point C: When the streaming client 204 shall start streaming the rest of the information, there is support in RTSP to jump forward in an amount of data. In this way it will be easy to start streaming data from the point of time which is identical with the length of the buffer. For instance, if the buffer is 15 s, then the streaming server 110 will have a message to start streaming data from point of time 15 s, instead of from the beginning.

The invention claimed is:

1. A procedure to transmit streaming video data to a terminal with a video client within a system that includes a network and the terminal, wherein the network includes a streaming server and an MMS-server, and the terminal includes an MMS-client, a streaming client, a streaming buffer to buffer streaming data, and a display unit to display the streaming video data, the procedure comprising:
dividing the streaming video data into high prioritized data which are I-frames, and low prioritized data which are P-frames, wherein the high prioritized data are transmitted via a secure medium, and the low prioritized data are transmitted over a standard channel;
displaying, after the transmission of the high and low prioritized data, the high and low prioritized data in a correct sequence continually in the terminal; and
buffering a first time interval of the streaming video data, to display the first time interval on the display unit, and at a same time as the first time interval is being displayed on the display unit, new streaming data of the streaming video data are transmitted to the terminal,
wherein the high prioritized data are transmitted via MMS and the low prioritized data are transmitted via streaming, and before a streaming service is initialized, an MMS notification message is initially transmitted to the terminal, the MMS notification message includes buffer data and information about the data flow, the buffer data being initial streaming video data that can be stored on the terminal prior to a user of the terminal starting a streaming service such that the streaming client can start streaming of buffer data without delay, and the MMS notification message which includes the buffer data being sent to the terminal prior to the user of the terminal requesting to start a streaming session for receiving the video data.

2. A procedure as claimed in claim 1, wherein any amount of high prioritized data can be transmitted in an MMS message.

3. A procedure as claimed in claim 1, wherein all high prioritized data are transmitted via MMS at a short video sequence.

4. A procedure as claimed in claim 1, wherein asymmetrical high prioritized data are transmitted via MMS at long video sequences.

5. A procedure as claimed in claim 4, wherein the procedure includes:
the streaming client putting the buffer data enclosed in the MMS-notification message in its streaming buffer;
the terminal initiating a session with the streaming server which starts streaming back the rest of the streaming video data;
the streaming server transmitting the rest of the streaming video data to the streaming client; and the streaming client putting the rest of the streaming video data in the streaming buffer.

6. A non-transitory computer readable storage medium encoded with computer executable instructions, which when executed by a computer, cause the computer to perform a method to transmit streaming video data to a terminal with a video client within a system that includes a network and the terminal, wherein the network includes a streaming server and an MMS-server, and the terminal includes an MMS-client, a streaming client, a streaming buffer to buffer streaming data, and a display unit to display the streaming video data, the method comprising:

dividing the streaming video data into high prioritized data which are I-frames, and low prioritized data which are P-frames, wherein the high prioritized data are transmitted via a secure medium, and the low prioritized data are transmitted over a standard channel;

displaying, after the transmission of the high and low prioritized data, the high and low prioritized data in a correct sequence continually in the terminal; and buffering a first time interval of the streaming video data, to display the first time interval on the display unit, and at a same time as the first time interval is being displayed on the display unit, new streaming data of the streaming video data are transmitted to the terminal, wherein the high prioritized data are transmitted via MMS and the low prioritized data are transmitted via streaming, and before a streaming service is initialized, an MMS notification message is initially transmitted to the terminal, the MMS notification message includes buffer data and information about the data flow, the buffer data being initial streaming video data that can be stored on the terminal prior to a user of the terminal starting a streaming service such that the streaming client can start streaming of buffer data without delay, and the MMS notification message which includes the buffer data being sent to the terminal prior to the user of the terminal requesting to start a streaming session for receiving the video data.

7. A system for controlling buffering of streaming data, the system comprising:

a network comprising a streaming server and an MMS-server, in which streaming video data is divided into high prioritized data which are I-frames, and low prioritized data which are P-frames, wherein the high prioritized data are transmitted via a secure medium to a terminal, whereas the low prioritized data are transmitted over a standard channel to the terminal; and the terminal comprising an MMS-client, a streaming client, a streaming buffer to buffer streaming data, and a display unit to display the streaming video data, and after receiving transmission of the high and low prioritized data from the network, said terminal is configured to display the high and low prioritized data in a correct sequence continually, and said terminal is configured to buffer a first time interval of the streaming video data to display the first time interval on the display unit, and at the same time as the first time interval is being displayed on the display unit, new streaming data of the streaming video data are configured to be received at the terminal, wherein the high prioritized data are transmitted to the terminal via MMS and the low prioritized data are transmitted to the terminal via streaming, and before a streaming service is initialized, an MMS notification message is initially transmitted to the terminal, the MMS notification message includes buffer data and information about the data flow, the buffer data being initial streaming video data that can be stored on the terminal prior to a user of the terminal starting a streaming service such that the streaming client can start streaming of buffer data without delay, and the terminal is configured to receive the MMS notification message which includes the buffer data prior to the user of the terminal requesting to start a streaming session for receiving the video data.

8. A terminal in a system for controlling buffering of streaming data, a network comprising a streaming server and an MMS-server, in which streaming video data is divided into high prioritized data which are I-frames, and low prioritized data which are P-frames, wherein the high prioritized data are transmitted via a secure medium to the terminal, whereas the low prioritized data are transmitted over a standard channel to the terminal, said terminal comprising:

an MMS-client;

a streaming client;

a streaming buffer to buffer streaming data; and a display unit to display the streaming video data, wherein after receiving transmission of the high and low prioritized data from the network, said terminal is configured to display the high and low prioritized data in a correct sequence continually, and the terminal is configured to buffer a first time interval of the streaming video data to display the first time interval on the display unit, and at the same time as the first time interval is being displayed on the display unit, new streaming data of the streaming video data are configured to be received at the terminal, wherein the high prioritized data are transmitted via MMS and the low prioritized data are transmitted via streaming, and before a streaming service is initialized, an MMS notification message is initially transmitted to the terminal, the MMS notification message includes buffer data and information about the data flow, the buffer data being initial streaming video data that can be stored on the terminal prior to a user of the terminal starting the streaming service such that the streaming client can start streaming of buffer data without delay, and the terminal is configured to receive the MMS notification message which includes the buffer data prior to the user of the terminal requesting to start a streaming session for receiving the video data.

\* \* \* \* \*